United States Patent
Mehfuz et al.

(10) Patent No.: US 10,014,016 B1
(45) Date of Patent: Jul. 3, 2018

(54) SECONDARY ALIGNMENT WAVEGUIDE WITH POLARIZATION ROTATOR

(71) Applicant: Seagate Technology LLC, Cupertino, CA (US)

(72) Inventors: Reyad Mehfuz, Londonderry (GB); Aidan Dominic Goggin, Donegal (IE); Kelly Elizabeth Hamilton, Londonderry (GB); John Bernard McGurk, Londonderry (GB); Choon How Gan, Londonderry (GB)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/463,238

(22) Filed: Mar. 20, 2017

(51) Int. Cl.
| | | |
|---|---|---|
| G11B 11/00 | (2006.01) |
| G11B 5/48 | (2006.01) |
| G02B 6/42 | (2006.01) |
| G02B 6/126 | (2006.01) |
| G02B 6/125 | (2006.01) |
| G02B 6/27 | (2006.01) |
| G11B 5/31 | (2006.01) |
| G11B 5/00 | (2006.01) |
| G11B 7/1263 | (2012.01) |
| G11B 7/1267 | (2012.01) |
| G11B 5/60 | (2006.01) |
| G11B 7/126 | (2012.01) |

(52) U.S. Cl.
CPC ............ *G11B 5/4866* (2013.01); *G02B 6/125* (2013.01); *G02B 6/126* (2013.01); *G02B 6/2766* (2013.01); *G02B 6/4225* (2013.01); *G11B 5/314* (2013.01); *G11B 5/6088* (2013.01); *G11B 7/126* (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,358,565 B2 | 1/2013 | Komura et al. | |
| 8,670,295 B1 | 3/2014 | Hu et al. | |
| 8,787,129 B1 | 7/2014 | Jin et al. | |
| 9,466,320 B1* | 10/2016 | Staffaroni | G11B 5/314 |
| | | | 369/13.33 |
| 2008/0204916 A1* | 8/2008 | Matsumoto | G11B 5/314 |
| | | | 369/13.33 |
| 2009/0185459 A1* | 7/2009 | Matsumoto | G11B 5/4826 |
| | | | 369/13.33 |

(Continued)

*Primary Examiner* — Tan X Dinh
(74) *Attorney, Agent, or Firm* — Hollingsworth Davis, LLC

(57) ABSTRACT

A recording head has a primary waveguide core with an input end at an input surface of the recording head and extends to a near-field transducer at a media-facing surface of the recording head. A secondary waveguide core is separated from the primary waveguide core by a gap such that light is evanescently coupled from the primary waveguide core to the secondary waveguide core. The secondary waveguide core has first and second bends such that an output end of the secondary waveguide core is parallel to and separated from the primary waveguide core in a cross-track direction. A polarization rotator rotates a polarization of light in the secondary waveguide core such that polarization-rotated light exits the secondary waveguide core at the media-facing surface.

19 Claims, 12 Drawing Sheets

(56) References Cited

U.S. PATENT DOCUMENTS

| | | | |
|---|---|---|---|
| 2011/0216635 A1* | 9/2011 | Matsumoto | G11B 5/105 369/13.33 |
| 2012/0092971 A1* | 4/2012 | Schreck | G11B 5/314 369/13.33 |
| 2013/0108212 A1* | 5/2013 | Peng | G02B 6/4215 369/13.33 |
| 2013/0223196 A1* | 8/2013 | Gao | G11B 5/6088 369/13.33 |
| 2014/0153861 A1* | 6/2014 | Peng | G02B 6/126 369/13.33 |
| 2014/0269236 A1* | 9/2014 | Kozlovsky | G11B 5/314 369/13.33 |
| 2015/0279394 A1* | 10/2015 | Peng | G11B 5/6088 369/13.33 |
| 2016/0133285 A1* | 5/2016 | Peng | G02B 6/1226 369/13.33 |
| 2016/0379677 A1* | 12/2016 | Van Orden | G11B 5/6088 369/13.33 |

\* cited by examiner

*Section 12-12*

*Section 13-13*

SECONDARY ALIGNMENT WAVEGUIDE WITH POLARIZATION ROTATOR

SUMMARY

The present disclosure is directed to a secondary alignment waveguide with a polarization rotator. In one embodiment, recording head has a primary waveguide core with an input end at an input surface of the recording head. The primary waveguide core extends to a near-field transducer at a media-facing surface of the recording head. A secondary waveguide core has a coupling end between the input surface and the media-facing surface and is separated from the primary waveguide core by a gap such that light is evanescently coupled from the primary waveguide core to the secondary waveguide core. The secondary waveguide core has first and second bends such that an output end of the secondary waveguide core near the media-facing surface is parallel to and separated from the primary waveguide core in a cross-track direction. A polarization rotator is near the output end of the secondary waveguide core. The polarization rotator rotates a polarization of light in the secondary waveguide core such that polarization-rotated light exits the secondary waveguide core at the media-facing surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing the writing magnetic field required for high-density recording. A waveguide delivers light to the near-field transducer and excites the near-field transducer. Light from a light source, such as an edge-emitting laser diode, is coupled into the waveguide through waveguide input coupler or a spot size converter. In current configurations, the laser diode is mounted on a magnetic slider in such a way that a transverse electric (TE) polarized light source excites a TE waveguide mode and/or transverse magnetic (TM) mode in the slider waveguide. The near-field transducer is designed to be coupled to light in one of these light delivery modes, and in response achieve surface plasmon resonance.

This disclosure describes apparatuses and processes that facilitate aligning a light source with a slider-integrated waveguide. In particular, these processes involve active alignment, in which power is applied to the laser during the alignment process. By detecting an intensity of light coupled into the slider, the position of the laser can be adjusted until the intensity is at a maximum value. In embodiments described below, a secondary waveguide is utilized that generates a far-field signal that is emitted out of the air-bearing surface of the slider where it is detected by an optical detector. The far-field signal is rotated, e.g., from a TE to a TM mode, to differentiate the coupled light from stray light. This secondary waveguide integrates a mini-mode converter in a bent waveguide and requires 10 times less input energy to generate detectable far-field signal than other mode-converter solutions.

Figure 1:
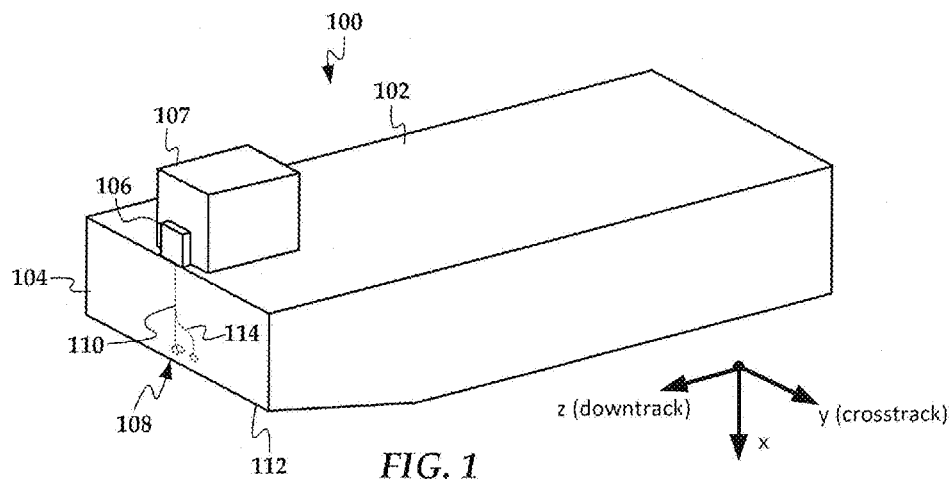
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode 106 mounted on submount 107) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium. A secondary waveguide 114 (also referred to herein as an "alignment waveguide") branches off from the main waveguide 110, the secondary waveguide being used for active laser-to-slider alignment.

Figure 2:
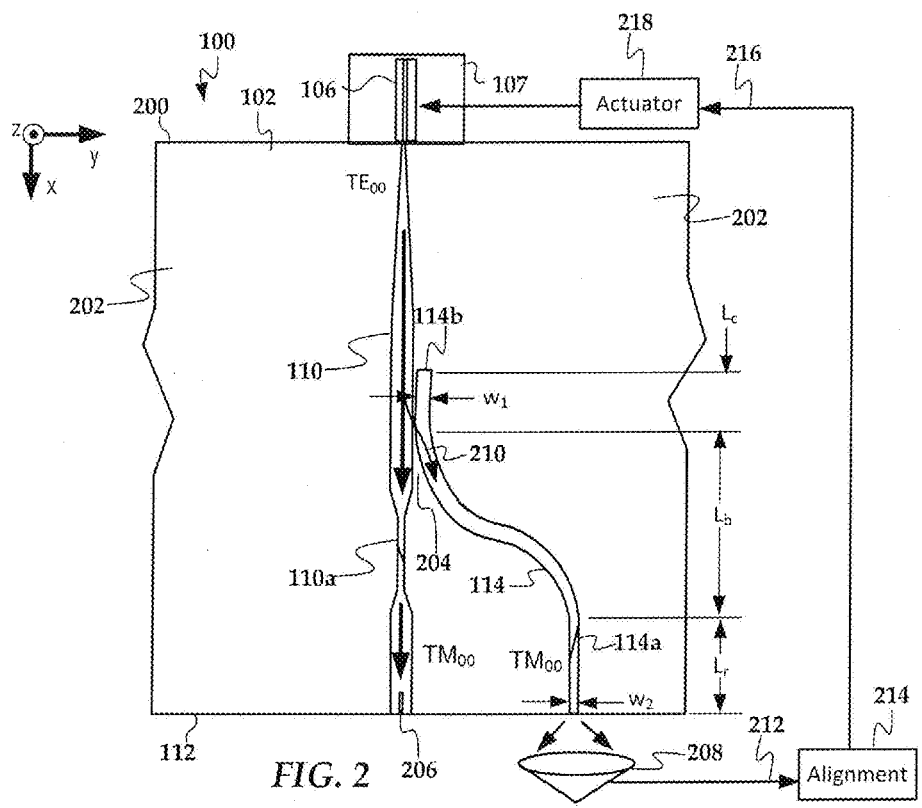
FIG. 2 is a cross-sectional view of a waveguide system according to an example embodiment.

In FIG. 2, a view of a slider trailing edge shows a configuration of the waveguides 110, 114 according to an example embodiment. A transverse electric (TE) polarized laser source 106, for instance, an edge-emitting laser diode mounted on a submount 107, launches light into a top surface 200 of the read/write head 100. The light source 106 excites a fundamental, transverse ($TE_{00}$) mode propagating along the core of waveguide 110. The core is formed of a high-index material and is surrounded on the sides, top and bottom by cladding 202. The cladding 202 also surrounds the core of the secondary, alignment waveguide 114. The cores of the waveguides 110, 114 are separated by a gap 204 near a coupling end 114b of the secondary, alignment waveguide core 114. Light is evanescently coupled between the waveguide cores 110, 114 at the gap 204.

A near-field transducer (NFT) 206 is located at the media-facing surface 112. In some embodiments, the NFT 206 is will efficiently achieve surface plasmon response in response to being illuminated by light in a fundamental transverse magnetic mode ($TM_{00}$). As a result, the primary waveguide 110 may include a mode converter in a narrowed region 110a that converts the $TE_{00}$ supplied by the laser 106 to $TM_{00}$. It will be understood that the concepts described herein may applicable to other types of mode conversion and/or polarization rotation. For example, in some embodiments, an NFT may require a higher-order mode, e.g., $TE_{10}$, and mode converters to achieve this conversion are known in the art and may be included in a primary waveguide in place of the illustrated mode converter 110a. In other embodiments, the primary waveguide core 110 may not include a mode converter.

In order to detect the effectiveness of the laser-to-slider on the mode converter, the secondary waveguide 114 also includes a mode converter 114a. This mode converter 114a performs a similar conversion as converter 110a, e.g., $TE_{00}$ to $TM_{00}$ polarization rotation in this example. The converted/rotated light is emitted out the media-facing surface 112 from where it illuminates an optical detector 208. The optical detector 208 can differentiate between the polarization-rotated light emitted from the secondary waveguide 114 and other sources of light (e.g., stray light), thereby accurately measuring the amplitude of light coupled into the secondary waveguide 114.

The optical detector 208 generates a signal 212 that is received by an alignment control element 214, e.g., a factory process-control computer. The control element 214 processes the signal 212 from the optical detector 208 and provides an output 216 that adjusts a relative position of the light source 106 (and optionally the submount 107) to the primary waveguide core 110 to ensure optimal alignment therebetween. For example, an electrical probe may connect to the light source 106 to cause it to illuminate, and an actuator 218 may be configured to adjust the position of the light source 106 before it is bonded to the slider body 102 in response to the output 216 such that the signal 212 is at a threshold value and/or maximum value.

Figure 3:
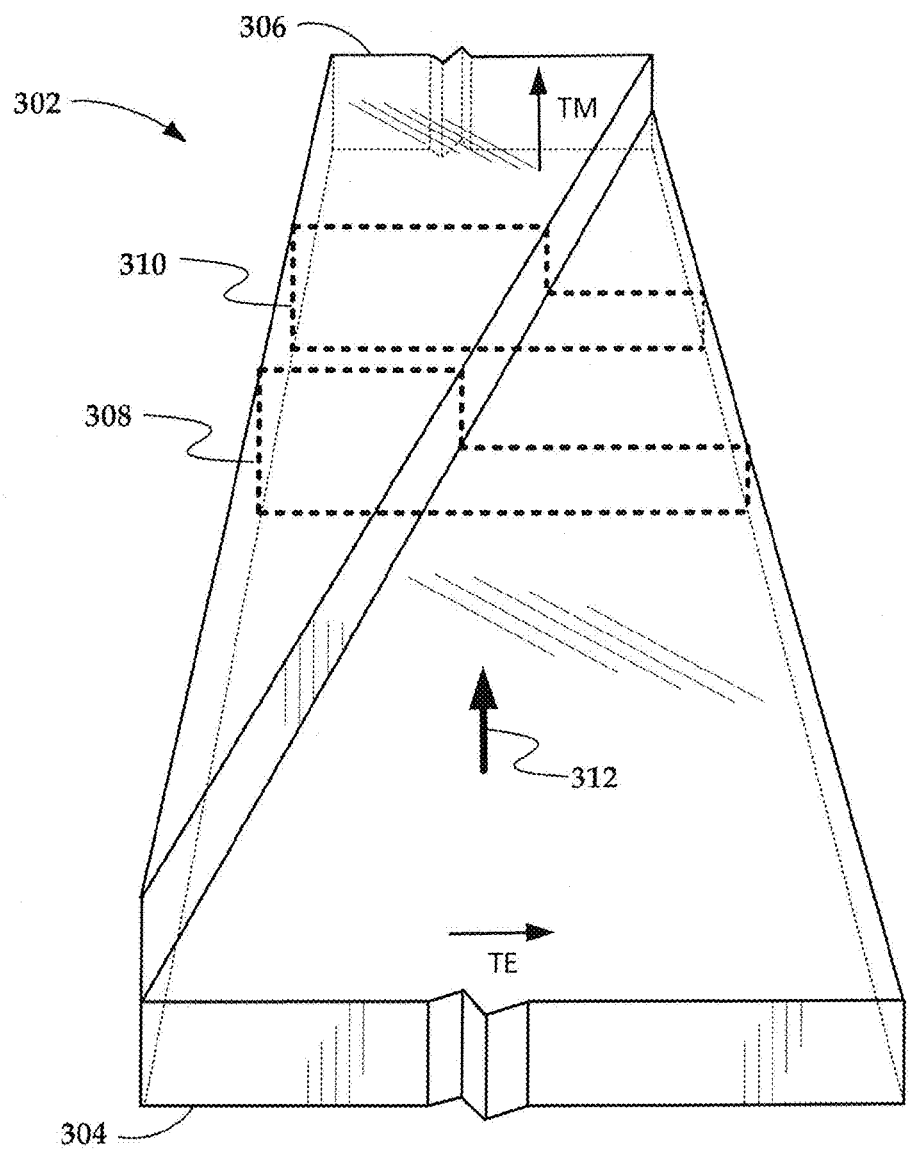
FIG. 3 is a perspective view of a polarization rotator according to an example embodiment.

The mode converters 110a, 110b may use a configuration as shown in FIG. 3. A waveguide core section configured as a mode converter 302 is illustrated in perspective view and without any surrounding cladding material. Light propagates in a first mode (here shown as TE mode) from a first end 304 and exits at a second end 806 in a second mode (here shown as TM mode). The ends 304, 306 of the mode converter 302 are rectangular and at least some dimensions of the mode converter 302 vary linearly along the length. This is obtained by adding an angled increase in thickness on one side of the mode converter 302, the increase being configured as a rectangular step/transition. As a result, the mode converter 302 exhibits a different cross sectional shape at different locations along the light propagation direction 312, as represented by sample cross sectional outlines 308 and 310.

Figure 4:
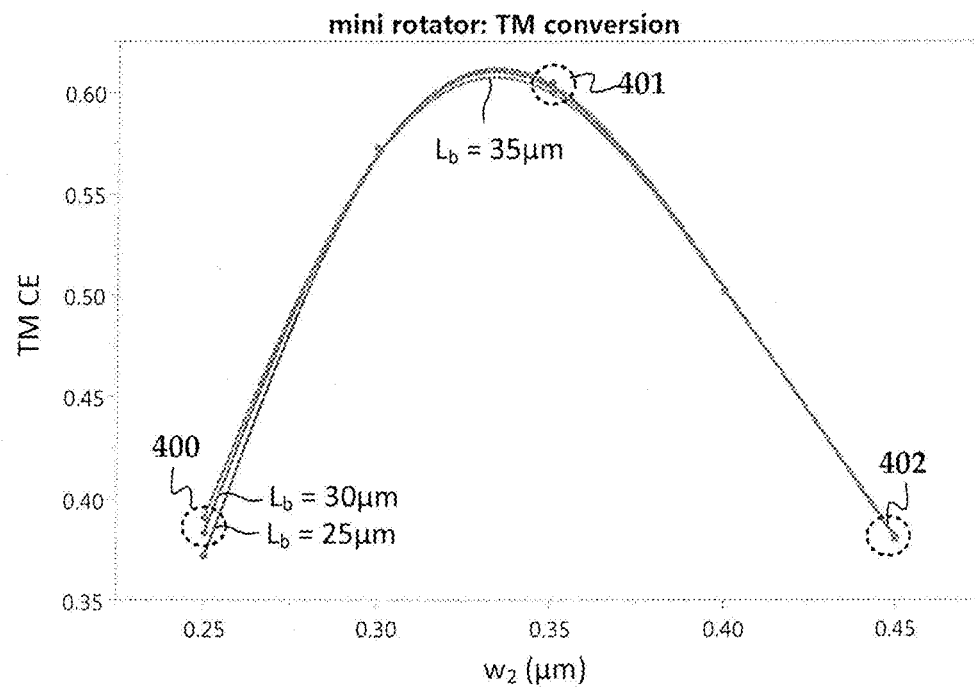
FIGS. 4-9 are respective graphs and contour plots showing calculated performance of polarization rotator geometries according to example embodiments.
Figure 5:
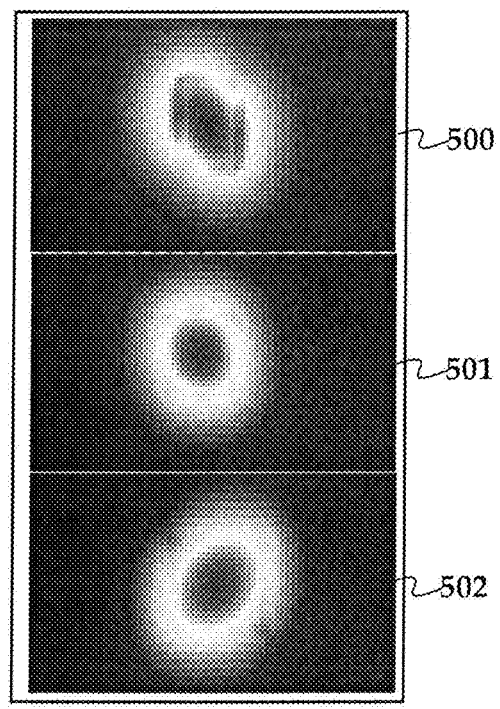

In FIG. 4, a graphs show results of an analysis that determines coupling efficiency (CE) for different bend lengths $L_b$ and secondary waveguide output width $w_2$ (see FIG. 2). The rotator length $L_r$ was set to 15 µm for all of these analyses. The optimum branch with is around 0.33 µm for this case. There is greater than 60% TM mode conversion for this rotator length, and far-field scattering efficiency is around 55%. In FIG. 5, contour plots 500-502 show field patterns in the secondary waveguide that correspond to respective data points 400-402 in FIG. 4.

Figure 6:
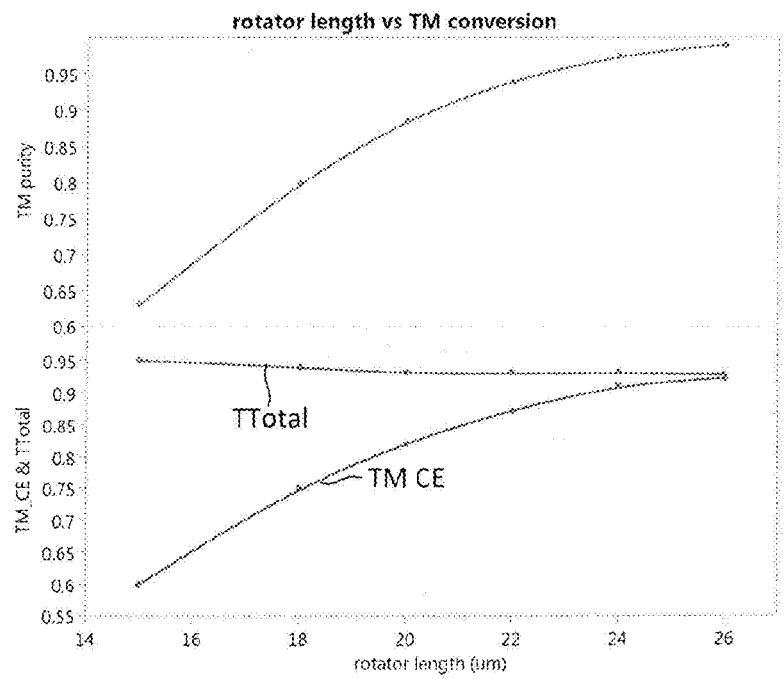
Figure 7:
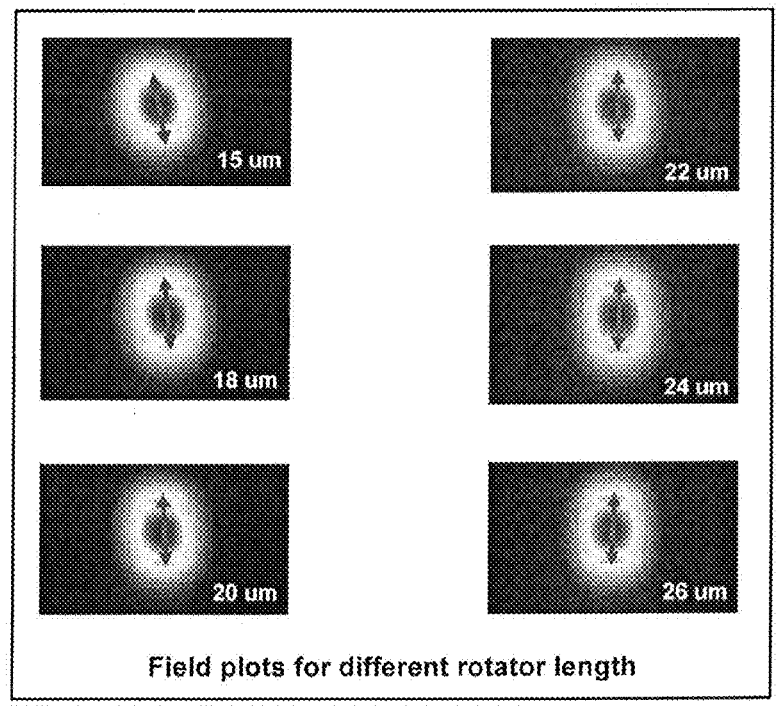

In FIG. 6, the upper graph shows the effect of rotator length ($L_r$, see FIG. 2) on TM purity (fraction of light converted to TM). The lower graph shows total and TM coupling efficiency as a function of rotator length. The TM conversion improves with rotator length, although there are practical limits due to head geometry. In FIG. 7, field plots show electric field in the secondary waveguide for these different rotator lengths.

Figure 8:
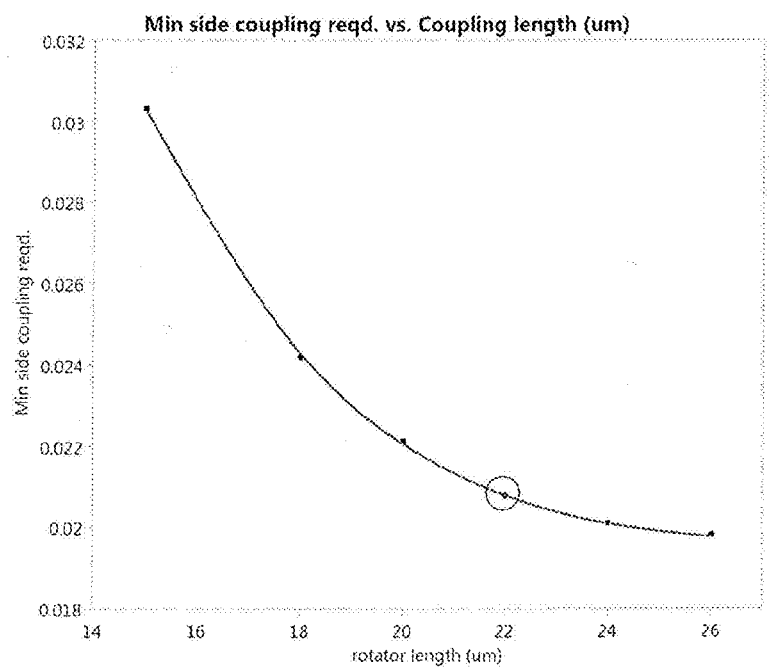

In FIG. 8, a plot shows the minimum side coupling required versus coupling length (Lc, see FIG. 2). Generally, the side coupling is the fraction of light coupled into the secondary waveguide (see arrow 210 in FIG. 2). The required amount of side coupling depends on the sensitivity of the detector. For example, assumed required detection of TM-mode-converted light is 1% of the total light coupled into the waveguide system. For a rotator length of 22 um (indicated by the circle on the graph), TM %=87.4%. Therefore, for 55% far-field scattering efficiency, the required side coupling x is determined by 0.874×0.55× x=0.01, resulting in x=0.0208, or 2.08%. The side coupling required for 4% detection is 874×0.55×x=0.04, resulting in x=0.0832, or 8.32%.

Figure 9:
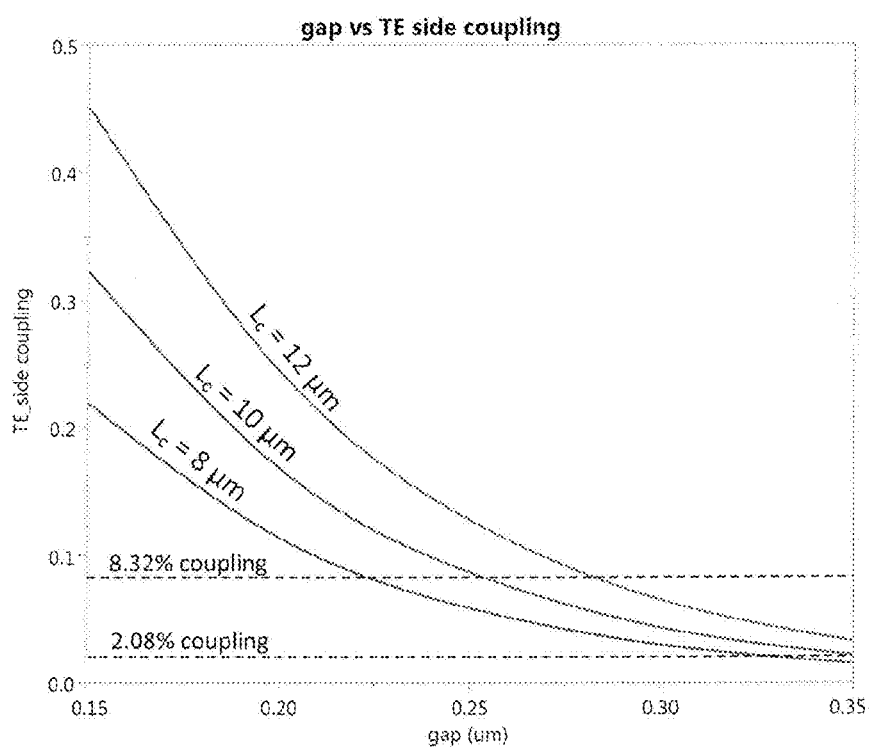

In FIG. 9, a graph shows the amount of TE light side coupled into the secondary waveguide for different values of the gap size and coupling length $L_c$ (see gap 204 and $L_c$ in FIG. 2). The dashed lines show the required side coupling for the 1% and 4% detection described above. Table 1 summarizes the results for these two levels of detection and the three coupling lengths shown in FIG. 9.

TABLE 1

| Coupling length (µm) | max gap (µm) (2.08%) | min gap (µm) (8.32%) |
|---|---|---|
| 8 | 0.32 | 0.24 |
| 10 | 0.34 | 0.26 |
| 12 | 0.35 | 0.28 |

Figure 10:
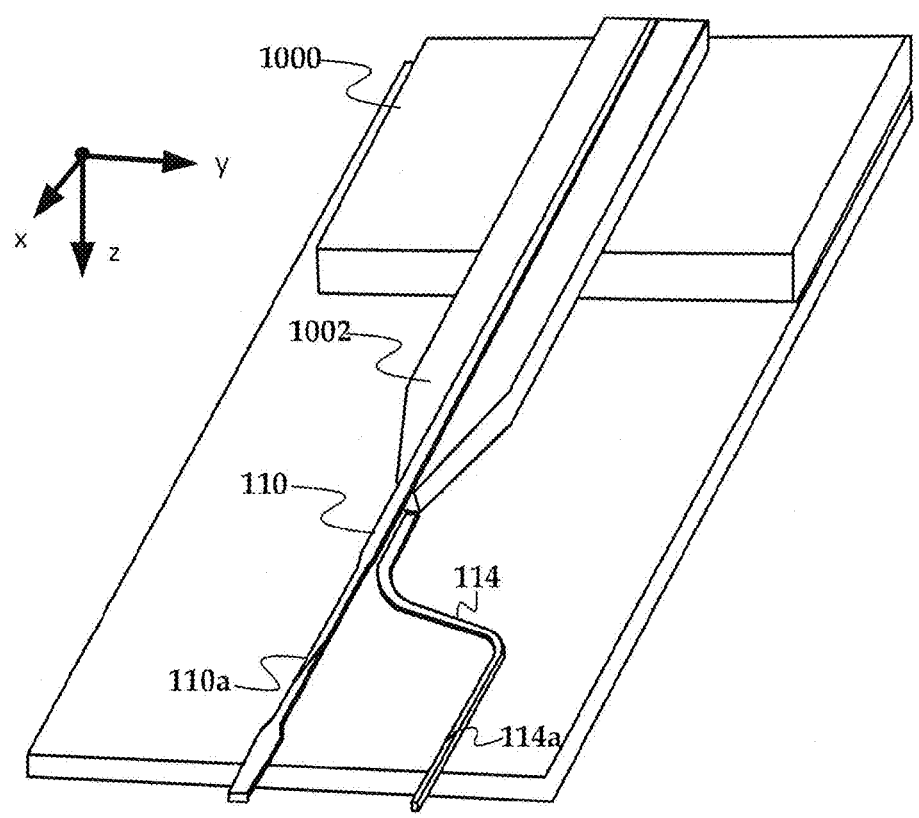
FIG. 10 is a perspective view of a waveguide system according to an example embodiment.

In FIG. 10, a perspective view shows a waveguide system according to an example embodiment. Primary and secondary waveguide cores 110, 114 similar to that shown in FIG. 2 are shown together with input coupling components. The input coupling components include a gradient index (GRIN) coupling layer 1000 and a coupling layer 1002 with an end taper. The GRIN layer 1000 has a refractive index that varies along its thickness (z-direction in this view). This changing index can be achieved, for example, by depositing alternating sub-layers having different refractive indices. By varying the thickness of the sub-layers, the desired index profile can be obtained. The coupling layer can be a dielectric layer (e.g., referred to as a CL1 layer and formed, for example of SiOxNy), of slightly higher index of refraction than surrounding layers, e.g., cladding layers that cover the top and sides of the waveguide cores 110, 114.

Figure 11:
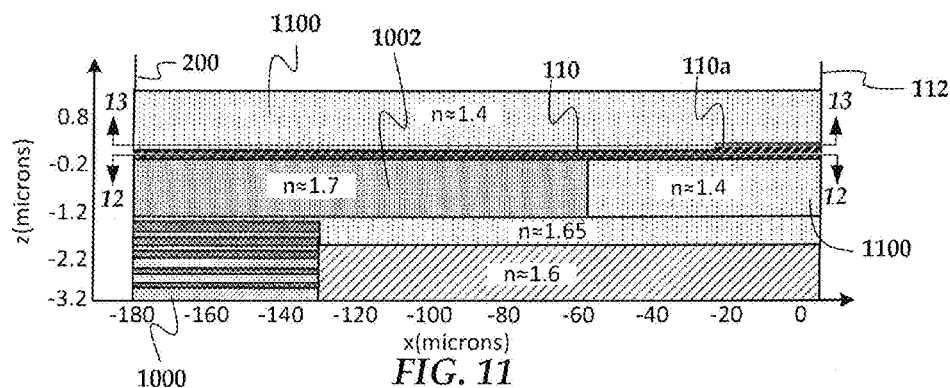
FIGS. 11-13 are cross-sectional views of the waveguide system shown in FIG. 10.
Figure 12:
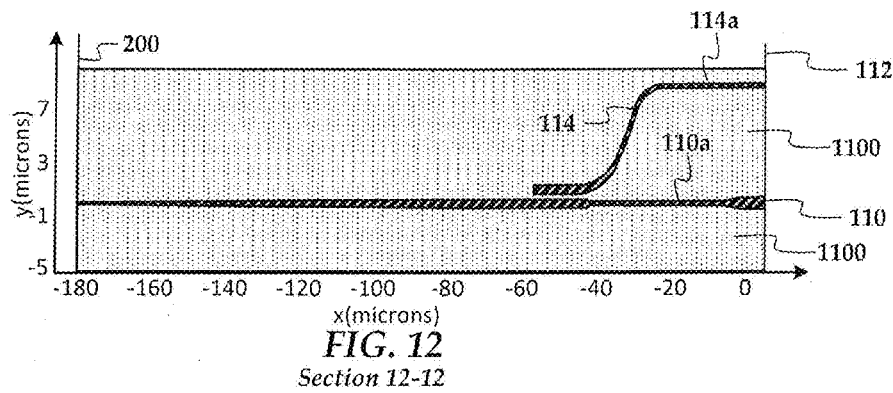
Figure 13:
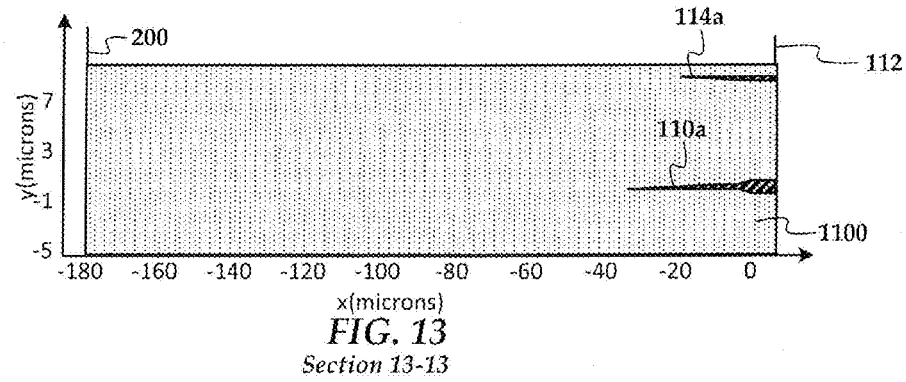

In FIGS. 11-13, cross-sectional views show details of the waveguide system shown in FIG. 10. In FIG. 11, a diagram shows a view through an xz-plane that bisects the primary waveguide core 110. This diagram shows example refractive indices and dimensions of various materials that surround the core 100, including cladding material 1100 (e.g., $SiO_2$). The cores 100 in this view and in FIGS. 12 and 13 have a refractive index of about 2.1, being formed e.g., of TaOx. The cross-sectional view in FIG. 12 and are taken through planes defined by respective section lines 12-12 and 13-13 shown in FIG. 11.

Figure 14:
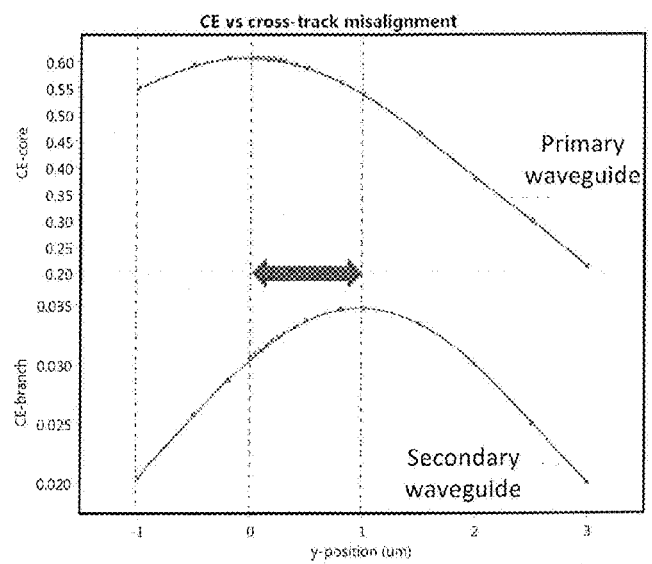
FIGS. 14 and 15 are respective graphs and contour plots showing calculated performance of the waveguide system of FIGS. 10-13.
Figure 15:
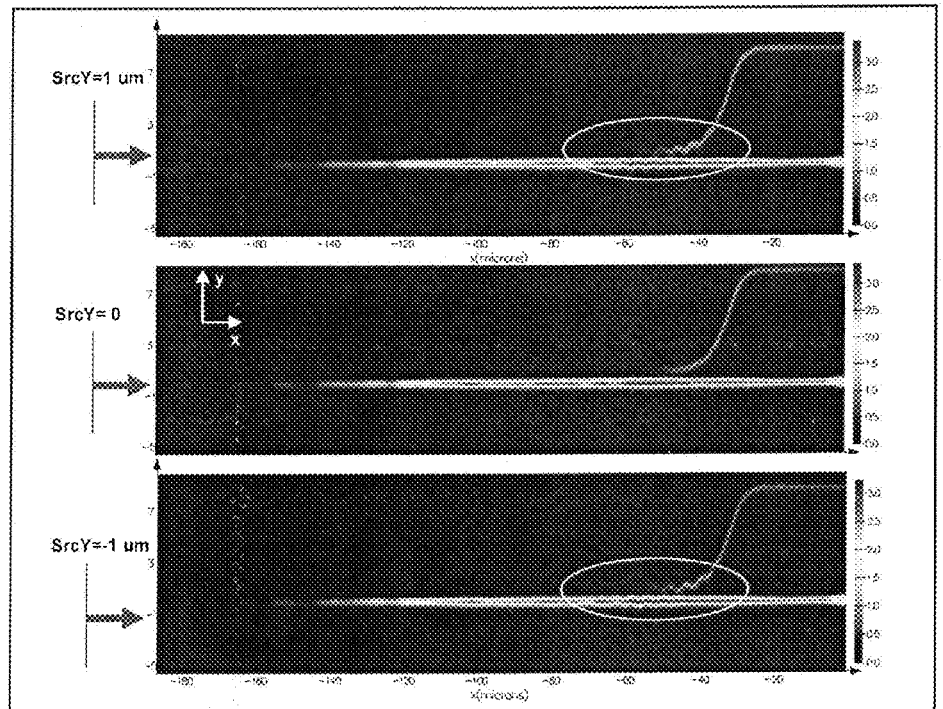

Because the secondary waveguide 114 is used for detecting light when the laser is misaligned to some degree, it should ensure sufficient output over some expected range of misalignment. Further, the output of the secondary waveguide 114 should be maximum at an alignment that corresponds to a maximum of the primary waveguide 110. In FIG. 14, a graph shows coupling efficiency for the primary waveguide 110 (WG core) and the secondary waveguide (alignment branch) as a function of cross-track misalignment of the light source (y=0 is perfect alignment). As indicated by the arrow, the peak coupling efficiency of the secondary waveguide peak is offset from the primary waveguide's peak efficiency by about 1 µm. A shown in the field diagrams of FIG. 15, this appears to be caused by stray light being coupled to the secondary waveguide 114.

Figure 16:
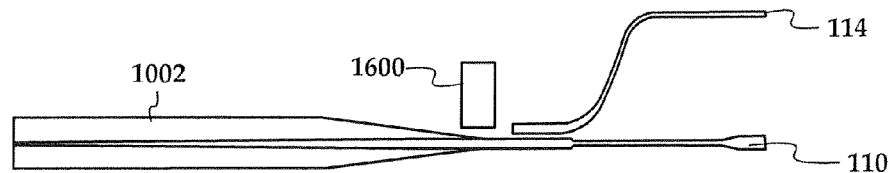
FIGS. 16 and 17 are plan views of secondary alignment waveguide stray light blocking features according to example embodiments.
Figure 17:
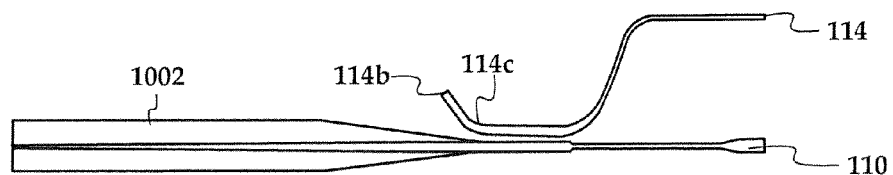
Figure 18:
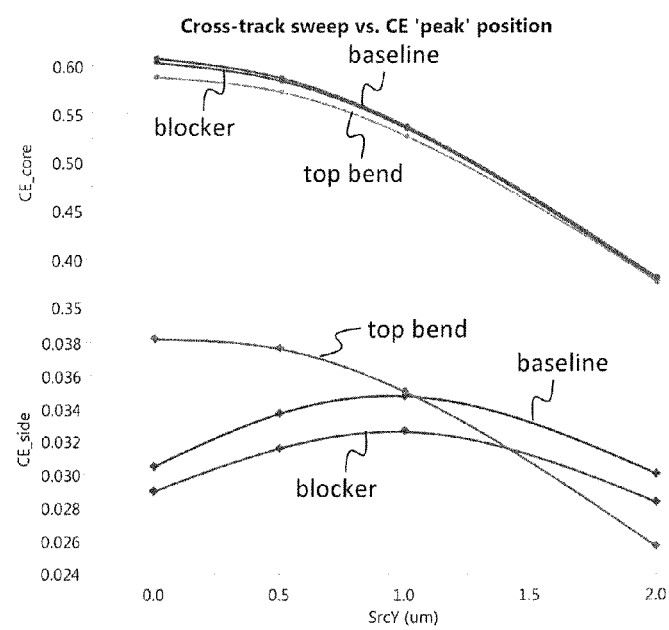
FIG. 18 is a graph showing performance of the stray light blocking features in FIGS. 16 and 17.

In FIGS. 16 and 17, plan views show two possible solutions to ensure peak efficiency in response to crosstrack offset is the same for the secondary, branch waveguide 114 and primary waveguide 110. In FIG. 16, an opaque blocker 1600 is shown between the coupling end of the secondary waveguide 114 and the light source. In FIG. 17, the secondary waveguide is shown with a top bend 114c that causes the coupling end 114b to extend away from the primary waveguide 110. In FIG. 18, graphs show analysis results for these two configurations compared to a baseline (e.g., as shown in FIG. 12). The top graph shows coupling efficiency for the primary waveguide and the bottom graph shows coupling efficiency for the secondary waveguide. The top bend 114c aligns the peak efficiency of the two waveguides 110, 114, and also exhibits higher peak efficiency (up to 4% more in this example).

Figure 19:
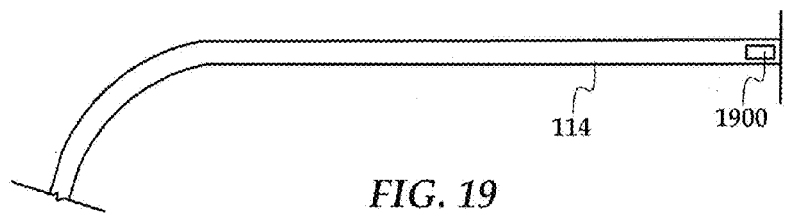
FIGS. 19-21 are respective plan and perspective views of polarization rotators according to other example embodiments.
Figure 20:
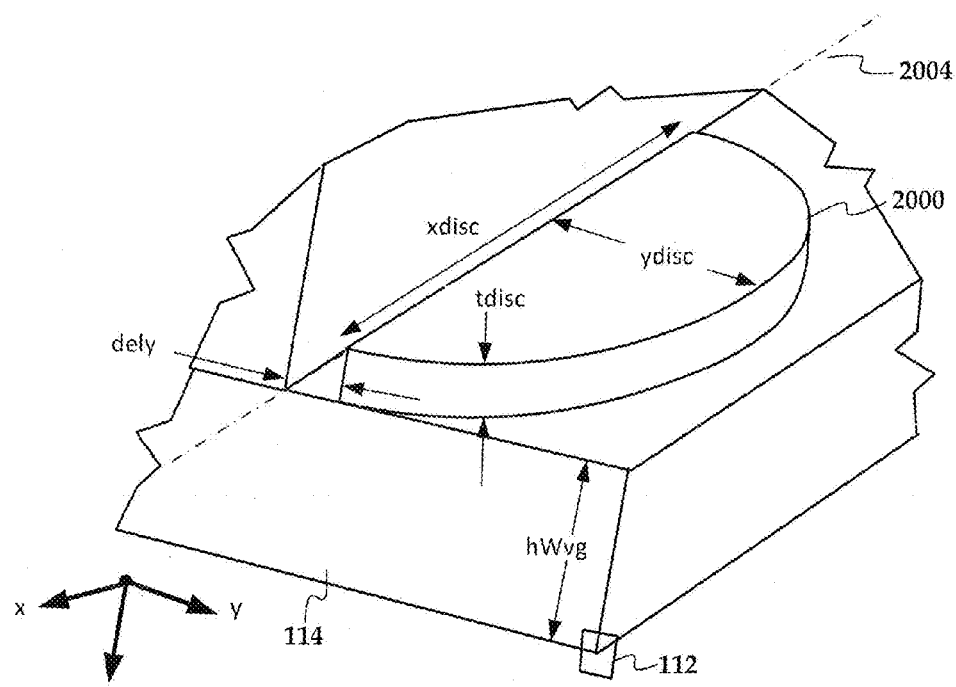

Instead of using the illustrated varying cross-section of the waveguide channel for polarization rotation, a secondary waveguide may instead use a thin-film metallic shape deposited at the sensor-facing end of the secondary waveguide. An example of this is shown by metallic shape 1900 in FIG. 19. In FIG. 20, a perspective view shows an example of another metallic shape, in this case a gold partial disk 2000. The partial disk 2000 is deposited directly onto or within the core. This partial disk was estimated to convert 4.64% of the light to TM mode with the following dimensions: ydisk=225 nm, xdisk=1140 nm, tdisc=50 nm, and dely=50 nm, where dely is the distance along the y-axis from the centerline 2004 of the waveguide 114 to the edge of the disk 2000.

Figure 21:
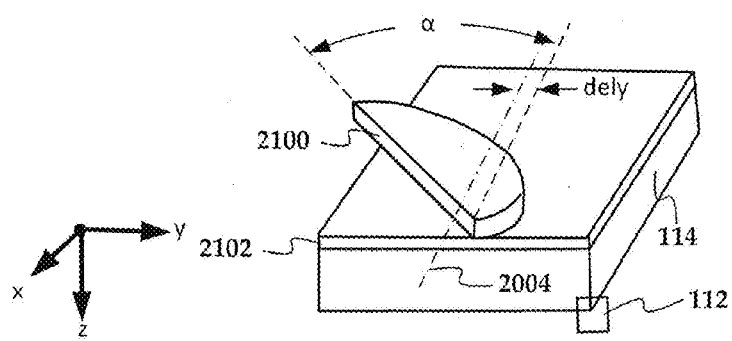
Figure 22:
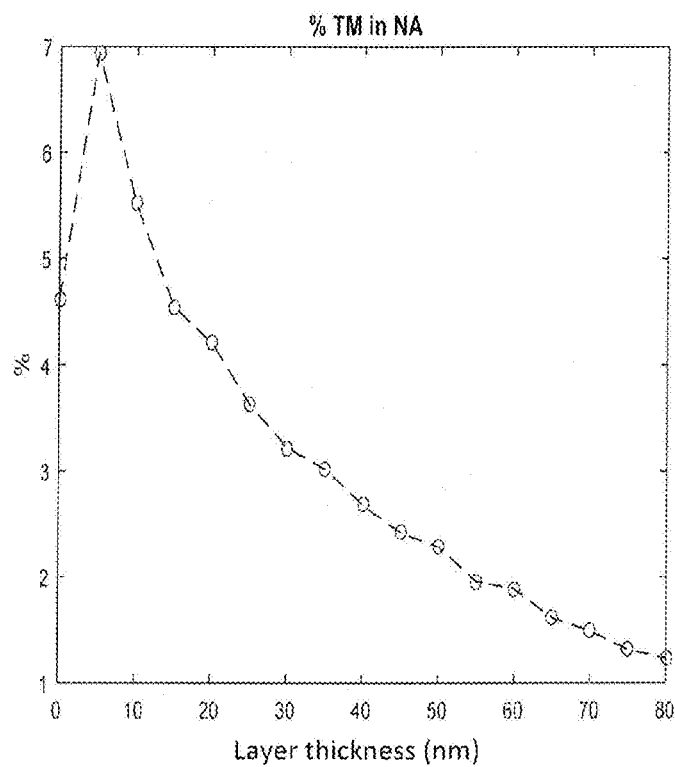
FIG. 22 is a graph showing performance of the polarization rotator in FIG. 21.

In FIG. 21, a perspective view shows another configuration of a secondary waveguide 114. In this example, a rotated partial disk 2100 may be deposited directly onto the waveguide core 114, or may be separated from the core by a thin layer 2102 of dielectric cladding, e.g., $SiO_2$. Without the layer, the rotated disk 2100 was found to convert 5.07% of the light to TM mode with the following dimensions: ydisk=225 nm, xdisc=1140 nm, tdisc=50 nm, dely=50 nm, and α=25 degrees. For the same geometry but a layer 2102 of 5 nm thickness, the TM conversion was increased to as much as nearly 7%, as seen in the graph of FIG. 22.

Figure 23:
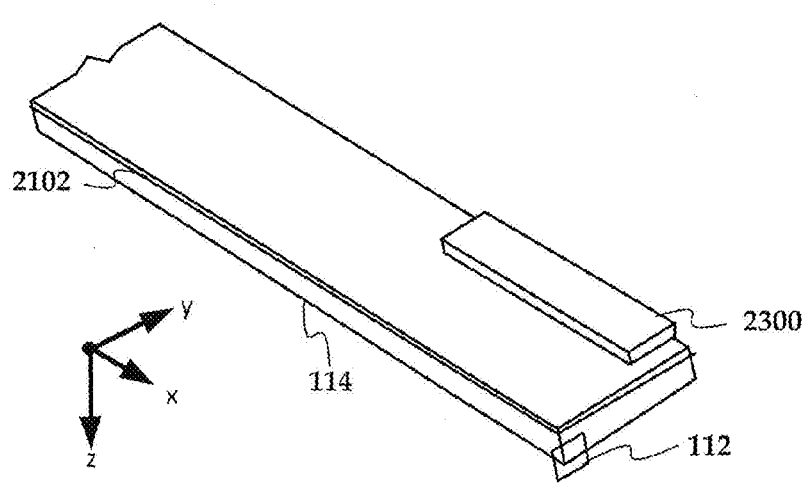
FIG. 23 is a perspective view of a polarization rotator according to another example embodiment.
Figure 24:
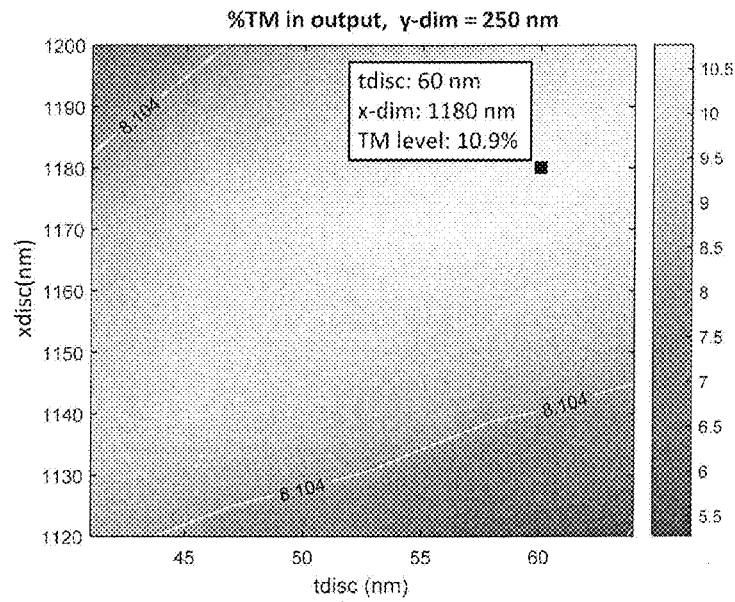
FIG. 24 is a graph showing performance of the polarization rotator in FIG. 23.

In FIG. 23, a perspective view shows another configuration of a secondary waveguide 114. In this example, a rectangular plate 2300 is deposited on a thin layer 2102 of dielectric cladding (e.g., $SiO_2$ at 15 nm thick) that is over the core 114, similar to the configuration in FIG. 21. As seen in the graph of FIG. 24, the plate was found to convert up to 10.9% of the light to TM mode with the following dimensions: y-dimension=250 nm, x-dimension=1180 nm, tdisc=60 nm, dely=50 nm.

Figure 25:
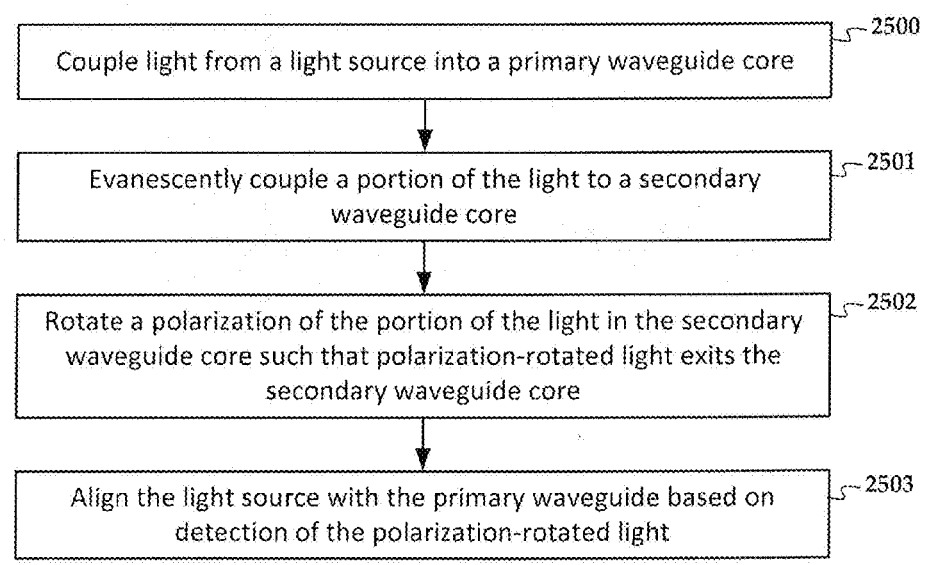
FIG. 25 is a flowchart of a method according to an example embodiment.

In FIG. 25, a flowchart shows a method according to an example embodiment. The method involves coupling 2500 light from a light source into a primary waveguide core. The primary waveguide core has an input end at an input surface of the recording head. The primary waveguide core extends to a near-field transducer at a media-facing surface.

A portion of the light is evanescently coupled 2501 to a secondary waveguide core separated from the primary waveguide core by a gap. The secondary waveguide core has first and second bends such that an output end of the secondary waveguide core near the media-facing surface is parallel to and separated from the primary waveguide core in a cross-track direction.

A polarization of the portion of the light is rotated 2502 in the secondary waveguide core such that polarization-rotated light exits the secondary waveguide core at the media-facing surface. The light source is aligned 2503 with the primary waveguide based on detection of the polarization-rotated light. For example, an actuator may be driven by a control element that processes a signal generated by a sensor that detects the polarization-rotated light and differentiates this light from stray light.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a primary waveguide core having an input end at an input surface of the recording head, the primary waveguide core extending to a near-field transducer at a media-facing surface of the recording head;
   a secondary waveguide core having a coupling end between the input surface and the media-facing surface and separated from the primary waveguide core by a gap such that light is evanescently coupled from the primary waveguide core to the secondary waveguide core, the secondary waveguide core comprising first and second bends such that an output end of the secondary waveguide core near the media-facing surface is parallel to and separated from the primary waveguide core in a cross-track direction; and a mode converter near the output end of the secondary waveguide core that rotates a polarization of light in the secondary waveguide core to differentiate the polarization-rotated light from stray light coupled into the recording head such that polarization-rotated light that exits the secondary waveguide core at the media-facing surface comprises a far-field signal that accurately measures the light coupled from the primary waveguide core to the secondary waveguide core.

2. The recording head of claim 1, wherein the mode converter converts the light from a fundamental transverse electric mode to a fundamental transverse magnetic mode.

3. The recording head of claim 1, further comprising a second mode converter that rotates the polarization of the light in the primary waveguide core.

4. The recording head of claim 1, wherein the mode converter comprises an angled transition in thickness in the secondary waveguide core.

5. The recording head of claim 1, wherein the mode converter comprises a metallic shape deposited at the output end of the secondary waveguide core.

6. The recording head of claim 5, wherein the metallic shape comprises a half disc located on one side of the secondary waveguide core.

7. The recording head of claim 6, wherein the metallic shape is separated from the secondary waveguide core by a layer of cladding material.

8. The recording head of claim 6, wherein the half disc is rotated at an acute angle relative to a light propagation direction of the secondary waveguide core.

9. The recording head of claim 1, wherein the secondary waveguide core comprises a bend on the coupling end of secondary waveguide core, the bend extending away from the primary waveguide core and preventing the coupling of stray light into the secondary waveguide core.

10. The recording head of claim 1, wherein the polarization-rotated light output from the secondary waveguide core facilitates aligning a laser light source with the primary waveguide core.

11. A method, comprising:
coupling light from a light source into a primary waveguide core having an input end at an input surface of a recording head, the primary waveguide core extending to a near-field transducer at a media-facing surface of the recording head;
evanescently coupling a portion of the light to a secondary waveguide core separated from the primary waveguide core by a gap, the secondary waveguide core comprising first and second bends such that an output end of the secondary waveguide core near the media-facing surface is parallel to and separated from the primary waveguide core in a cross-track direction;
rotating a polarization of the portion of the light in the secondary waveguide core to differentiate the polarization-rotated portion of the light from stray light coupled into the recording head such that the polarization-rotated portion of the light that exits the secondary waveguide core at the media-facing surface comprises a far-field signal that accurately measures the light coupled from the primary waveguide core to the secondary waveguide core; and aligning the light source with the primary waveguide based on detection of the polarization-rotated portion of the light.

12. The method of claim 11, wherein rotating the polarization of the portion of the light comprises rotating the polarization from a fundamental transverse electric mode to a fundamental transverse magnetic mode.

13. The method of claim 11, wherein rotating the polarization of the portion of the light comprises rotating the polarization via an angled transition in thickness in the secondary waveguide core.

14. The method of claim 11, wherein rotating the polarization of the portion of the light comprises rotating the polarization via a metallic shape deposited at the output end of the secondary waveguide core.

15. The method of claim 11, further comprising blocking stray light from coupling with the secondary waveguide core via a bend on an end of the secondary waveguide that faces the input surface, the bend extending away from the primary waveguide core.

16. A system comprising:
a recording head comprising:
a light source at an input surface of the recording head;
a primary waveguide core having an input end at the input surface and extending to a near-field transducer at a media-facing surface of the recording head, light from the light source being coupled into the input end;
an alignment waveguide core separated from the primary waveguide core by a gap such that a portion of the light is evanescently coupled from the primary waveguide core to the alignment waveguide core, the alignment waveguide core comprising first and second bends such that an output end of the alignment waveguide core near the media-facing surface is parallel to and separated from the primary waveguide core in a cross-track direction, the alignment waveguide core comprising a mode converter that rotates a polarization of light in the alignment waveguide core to differentiate the polarization-rotated light from stray light coupled into the recording head such that the polarization-rotated light that exits the alignment waveguide core at the media-facing surface comprises a far-field signal that accurately measures the light coupled from the primary waveguide core to the secondary waveguide core;
an optical detector configured to detect the polarization-rotated light and generate a signal in response thereto; and
a control element configured to receive the signal and generate an output that causes an actuator to align the light source with the primary waveguide core.

17. The system of claim 16, wherein the mode converter comprises an angled transition in thickness in the alignment waveguide core.

18. The system of claim 16, wherein the mode converter comprises a metallic shape deposited at the output end of the alignment waveguide core.

19. The system of claim 16, wherein the alignment waveguide core comprises a bend at a coupling end of the alignment waveguide core proximate the gap, the bend extending away from the primary waveguide core and preventing the coupling of stray light into the alignment waveguide core.

* * * * *